US012617479B2

(12) United States Patent
Hiraoka et al.

(10) Patent No.: US 12,617,479 B2
(45) Date of Patent: May 5, 2026

(54) WORK VEHICLE

(71) Applicant: Kubota Corporation, Osaka (JP)

(72) Inventors: Minoru Hiraoka, Sakai (JP); Tomoyoshi Sakano, Sakai (JP); Junichi Ishikawa, Sakai (JP)

(73) Assignee: Kubota Corporation, Osaka (JP)

( * ) Notice: Subject to any disclaimer, the term of this patent is extended or adjusted under 35 U.S.C. 154(b) by 418 days.

(21) Appl. No.: 18/037,369

(22) PCT Filed: Dec. 1, 2021

(86) PCT No.: PCT/JP2021/044091
§ 371 (c)(1),
(2) Date: May 17, 2023

(87) PCT Pub. No.: WO2022/124159
PCT Pub. Date: Jun. 16, 2022

(65) Prior Publication Data
US 2023/0415829 A1 Dec. 28, 2023

(30) Foreign Application Priority Data

Dec. 11, 2020 (JP) ................................. 2020-206227

(51) Int. Cl.
| | |
|---|---|
| *B62D 55/04* | (2006.01) |
| *B62D 55/065* | (2006.01) |
| *B62D 55/084* | (2006.01) |
| *B62D 55/116* | (2006.01) |
| *B62D 61/12* | (2006.01) |

(52) U.S. Cl.
CPC ......... *B62D 55/04* (2013.01); *B62D 55/0655* (2013.01); *B62D 55/084* (2013.01); *B62D 55/116* (2013.01); *B62D 61/12* (2013.01)

(58) Field of Classification Search
CPC .... B62D 55/04; B62D 61/12; B62D 55/0655; B62D 55/084; B62D 55/116; B62D 55/075; B62B 19/02; B60G 2200/341; B60G 2200/342
See application file for complete search history.

(56) References Cited

U.S. PATENT DOCUMENTS

| | | | | |
|---|---|---|---|---|
| 1,774,835 | A | * | 9/1930 | Lombard ................ B62B 19/02 |
| | | | | 180/185 |
| 3,664,448 | A | * | 5/1972 | Hudis ........................ B60P 1/02 |
| | | | | 180/9.46 |

(Continued)

FOREIGN PATENT DOCUMENTS

| | | | |
|---|---|---|---|
| JP | 63203483 | A | 8/1988 |
| JP | 7277232 | A | 10/1995 |

(Continued)

*Primary Examiner* — Timothy Wilhelm
(74) *Attorney, Agent, or Firm* — The Webb Law Firm

(57) ABSTRACT

A work vehicle includes a body 1; a plurality of travel wheels 2 at front and back portions of the body 1 on each of left and right sides; a plurality of holder mechanisms A held by the body 1 and holding the respective travel wheels 2 in such a manner as to be capable of moving the travel wheels 2 independently of one another relative to the body 1; and a plurality of crawler travel devices E attachable to and detachable from the respective holder mechanisms A.

7 Claims, 10 Drawing Sheets

(56) References Cited

U.S. PATENT DOCUMENTS

| | | | | |
|---|---|---|---|---|
| 3,792,745 | A * | 2/1974 | Files | B62D 11/20 |
| | | | | 180/9.46 |
| 4,360,293 | A * | 11/1982 | Wade | E02B 5/02 |
| | | | | 404/96 |
| 4,387,814 | A * | 6/1983 | Beduhn | B66C 23/84 |
| | | | | 180/9.46 |
| 4,496,015 | A * | 1/1985 | Porter, Jr. | B60S 9/10 |
| | | | | 180/9.26 |
| 4,579,182 | A * | 4/1986 | Dewing | B62D 11/20 |
| | | | | 180/9.46 |
| 4,702,331 | A * | 10/1987 | Hagihara | B62D 55/116 |
| | | | | 180/9.46 |
| 4,768,601 | A * | 9/1988 | Okano | B60G 5/02 |
| | | | | 180/24.07 |
| 4,977,971 | A * | 12/1990 | Crane, III | B62D 55/075 |
| | | | | 901/1 |
| 5,632,350 | A * | 5/1997 | Gauvin | B60D 1/00 |
| | | | | 280/492 |
| 5,954,148 | A * | 9/1999 | Okumura | B62D 55/04 |
| | | | | 305/131 |
| 6,116,362 | A * | 9/2000 | Schubert | B62D 12/00 |
| | | | | 180/9.46 |
| 6,311,795 | B1 * | 11/2001 | Skotnikov | B60G 17/0152 |
| | | | | 280/6.154 |
| 6,334,496 | B1 * | 1/2002 | Hiraki | B62D 55/02 |
| | | | | 180/9.5 |
| 6,390,728 | B1 * | 5/2002 | Casters | E01C 23/04 |
| | | | | 404/100 |
| 6,471,442 | B1 * | 10/2002 | Deeb | E01C 19/40 |
| | | | | 404/96 |
| 6,481,923 | B1 * | 11/2002 | Casters | E01C 19/40 |
| | | | | 404/104 |
| 6,692,185 | B2 * | 2/2004 | Colvard | B62D 11/20 |
| | | | | 180/9.5 |
| 7,942,604 | B2 * | 5/2011 | Willis | B62D 7/026 |
| | | | | 404/85 |
| 8,075,069 | B2 * | 12/2011 | Pech | B62D 55/30 |
| | | | | 305/195 |
| 8,459,898 | B2 * | 6/2013 | Guntert, Jr. | E01C 19/42 |
| | | | | 404/85 |
| 8,540,040 | B2 * | 9/2013 | Simula | B62D 55/065 |
| | | | | 180/9.5 |
| 8,776,931 | B2 * | 7/2014 | Boivin | B62D 55/084 |
| | | | | 180/9.26 |
| 9,096,264 | B2 * | 8/2015 | Connors | A01C 7/208 |
| 9,096,281 | B1 * | 8/2015 | Li | B62D 55/04 |
| 9,464,716 | B2 * | 10/2016 | Farr | E01C 19/42 |
| 9,637,186 | B1 * | 5/2017 | Goldenberg | B62D 55/02 |
| 9,650,088 | B2 * | 5/2017 | Haar | B62D 55/04 |
| 9,663,918 | B2 * | 5/2017 | Vik | B62D 55/14 |
| 9,682,736 | B1 * | 6/2017 | Prickel | B62D 55/04 |
| 9,684,308 | B2 * | 6/2017 | Dahm | B62D 11/20 |
| 9,688,322 | B1 * | 6/2017 | Prickel | B62D 55/084 |
| 9,689,119 | B2 * | 6/2017 | Dahm | B62D 21/14 |
| 9,758,980 | B2 * | 9/2017 | Ben Don | B60L 53/12 |
| 9,908,571 | B2 * | 3/2018 | Guntert, Jr. | E01C 19/42 |
| 9,914,496 | B2 * | 3/2018 | Franceschi | B62D 55/06 |
| 9,969,427 | B1 * | 5/2018 | Engels | E01C 19/187 |
| 10,266,215 | B2 * | 4/2019 | Jean | B62D 55/084 |
| 10,814,911 | B2 * | 10/2020 | Maniar | F15B 15/149 |
| 10,906,601 | B2 * | 2/2021 | Aoki | B62D 55/065 |
| 11,040,589 | B2 * | 6/2021 | Ishikawa | B60G 7/02 |
| 11,077,896 | B1 * | 8/2021 | Ourada | B62D 55/0655 |
| 11,091,358 | B1 * | 8/2021 | Ourada | B62D 55/14 |
| 11,235,821 | B2 * | 2/2022 | Liu | B62D 55/075 |
| 11,235,824 | B2 * | 2/2022 | Ishikawa | B62D 61/12 |
| 11,260,922 | B2 * | 3/2022 | Ishikawa | B62D 61/12 |
| 11,376,940 | B2 * | 7/2022 | Crane | B60K 7/0007 |
| 11,453,436 | B2 * | 9/2022 | Argenziano | B62D 5/14 |
| 11,498,632 | B2 * | 11/2022 | Ishikawa | B60G 17/0162 |
| 11,524,735 | B2 * | 12/2022 | Ishikawa | B25J 5/007 |
| 11,679,639 | B2 * | 6/2023 | Rife, Jr. | B60G 17/0165 |
| | | | | 701/38 |
| 11,753,093 | B2 * | 9/2023 | Weyer | B62D 55/12 |
| | | | | 305/132 |
| 11,767,071 | B2 * | 9/2023 | Ishikawa | B62D 12/00 |
| | | | | 280/400 |
| 11,780,282 | B2 * | 10/2023 | Gao | B60K 7/00 |
| | | | | 280/5.514 |
| 11,805,717 | B2 * | 11/2023 | Kalverkamp | B62D 49/0635 |
| 12,054,370 | B2 * | 8/2024 | Hackenberg | B66F 11/044 |
| 12,072,712 | B2 * | 8/2024 | Weiermair | B62D 7/026 |
| 2005/0133281 | A1 * | 6/2005 | Boivin | B62D 55/04 |
| | | | | 180/9.1 |
| 2006/0042848 | A1 | 3/2006 | Bushinski | |
| 2006/0145433 | A1 * | 7/2006 | Kim | B62D 61/10 |
| | | | | 280/5.28 |
| 2007/0194540 | A1 * | 8/2007 | Caspi | B62D 55/075 |
| | | | | 280/5.22 |
| 2008/0223630 | A1 * | 9/2008 | Couture | B62D 25/2054 |
| | | | | 901/1 |
| 2014/0161528 | A1 * | 6/2014 | Guntert, Jr. | E01C 19/48 |
| | | | | 404/83 |
| 2019/0389268 | A1 * | 12/2019 | Ishikawa | B60G 17/015 |
| 2020/0009931 | A1 * | 1/2020 | Zona | B25J 9/0087 |
| 2020/0122538 | A1 * | 4/2020 | Engelmann | B62D 55/065 |
| 2020/0354003 | A1 * | 11/2020 | Ishikawa | B62D 12/00 |
| 2024/0017581 | A1 * | 1/2024 | Ida | B62D 61/10 |

FOREIGN PATENT DOCUMENTS

| | | |
|---|---|---|
| JP | 9142347 A | 6/1997 |
| JP | 11222151 A | 8/1999 |
| JP | 2011111034 A | 6/2011 |
| WO | 2016181913 A1 | 11/2016 |

* cited by examiner

WORK VEHICLE

CROSS-REFERENCE TO RELATED APPLICATIONS

This application is the United States national phase of International Application No. PCT/JP2021/044091 filed Dec. 1, 2021, and claims priority to Japanese Patent Application No. 2020-206227 filed Dec. 11, 2020, the disclosures of which are hereby incorporated by reference in their entireties.

BACKGROUND OF THE INVENTION

Field of the Invention

The present invention relates to a work vehicle.

Description of Related Art

Patent Literature 1 discloses a rover designed to travel on rough terrain. The rover includes a body and four travel wheels each held by the body with a link mechanism in-between. The link mechanism is provided with an electric motor, and is drivable by means of the driving force from the electric motor to bend and stretch.

Patent Literature 1

Japanese Unexamined Patent Application Publication, Tokukaihei, No. H9-142347

The rover disclosed in Patent Literature 1, which includes travel wheels, is only capable of traveling on a travel surface on which a vehicle is capable of traveling with use of travel wheels.

SUMMARY OF THE INVENTION

It is an object of the present invention to provide a work vehicle capable of traveling on various travel surfaces.

To attain the above object, a work vehicle of the present invention includes: a body; a plurality of travel wheels at front and back portions of the body on each of left and right sides; a plurality of holder mechanisms held by the body and holding the respective travel wheels in such a manner as to be capable of moving the travel wheels independently of one another relative to the body; and a plurality of crawler travel devices attachable to and detachable from the respective holder mechanisms.

With the above configuration, the work vehicle includes crawler travel devices attachable to and detachable from the respective holder mechanisms, and is thereby capable of traveling on various travel surfaces. The work vehicle is, for instance, capable of traveling on a smooth travel surface with use of travel wheels and on an uneven or soft travel surface with use of crawler travel devices.

The work machine may preferably further include: the holder mechanisms each include a hydraulic motor configured to drive a corresponding one of the travel wheels, and the crawler travel devices are each drivable by a corresponding one of the hydraulic motors while the crawler travel device is attached to a corresponding one of the holder mechanisms.

The above configuration allows use of hydraulic motors to drive both the travel wheels and the crawler travel devices. This simplifies the structure of the work vehicle, as compared to a work vehicle including separate driving sources for travel wheels and crawler travel devices.

The work machine may preferably further include: the crawler travel devices each include: a driving sprocket; a driven sprocket; and a belt wound around the driving sprocket and the driven sprocket, and with each crawler travel device attached to a corresponding one of the holder mechanisms, the driving sprocket is coaxial with a corresponding one of the travel wheels and drivable by a corresponding one of the hydraulic motors.

With the above configuration, each driving sprocket is coaxial with the corresponding travel wheel and is drivable by the corresponding hydraulic motor. This simplifies the mechanism for transmitting the driving force from the hydraulic motor to the driving sprocket.

The work machine may preferably further include: a plurality of auxiliary wheels disposed at front and back portions of the body on each of the left and right sides and held by the respective holder mechanisms, wherein with each crawler travel device attached to a corresponding one of the holder mechanisms, the driven sprocket is coaxial with a corresponding one of the auxiliary wheels.

With the above configuration, each driven sprocket is coaxial with the corresponding auxiliary wheel. This downsizes the holder mechanisms, the auxiliary wheels, and the entire crawler travel devices for a simple structure.

The work machine may preferably further include: the driving sprocket has an axis apart from an outer surface of the belt by a first distance, whereas a corresponding one of the travel wheels has an axis apart from an outer surface of the corresponding travel wheel by a second distance, the first distance being equal to or smaller than the second distance.

The above configuration allows the work vehicle to have its travel wheels in contact with a travel surface and travel with use of the travel wheels even with the crawler travel devices attached to the respective holder mechanisms, with the result of improved convenience.

The work machine may preferably further include: the holder mechanisms each include:

a bendable link mechanism; and an orientation changer configured to change an orientation of the bendable link mechanism independently, wherein the bendable link mechanism has a leading end provided with a corresponding one of the travel wheels.

With the above configuration, the holder mechanisms for moving the respective travel wheels each include a bendable link mechanism and an orientation changer. This allows the holder mechanisms to be simple and sturdy.

The work machine may preferably further include: the orientation changer is a hydraulic cylinder.

The above configuration uses hydraulic power to change the orientation of each holder mechanism. This allows a reliable change of the orientation of each holder mechanism even with the relatively heavy crawler travel devices attached to the respective holder mechanisms.

The work machine may preferably further include: the body includes: a back body section; and a front body section swingable in a left-right direction of the body relative to the back body section, wherein the front body section holds each holder mechanism holding a front one of the travel wheels, and the back body section holds each holder mechanism holding a rear one of the travel wheels.

The above configuration allows the front body section to swing relative to the back body section for a turn with the front travel wheels and crawler travel devices non-parallel to the rear travel wheels and crawler travel devices. The work vehicle may, with the above configuration, not include mechanisms for operating the travel wheels and the crawler travel devices.

BRIEF DESCRIPTION OF THE DRAWINGS

FIG. 3 is a plan view of a holder mechanism and a crawler travel device as attached thereto and detached therefrom.

FIG. 11 is a flowchart of an orientation changing process.

DESCRIPTION OF THE INVENTION

Figure 1:
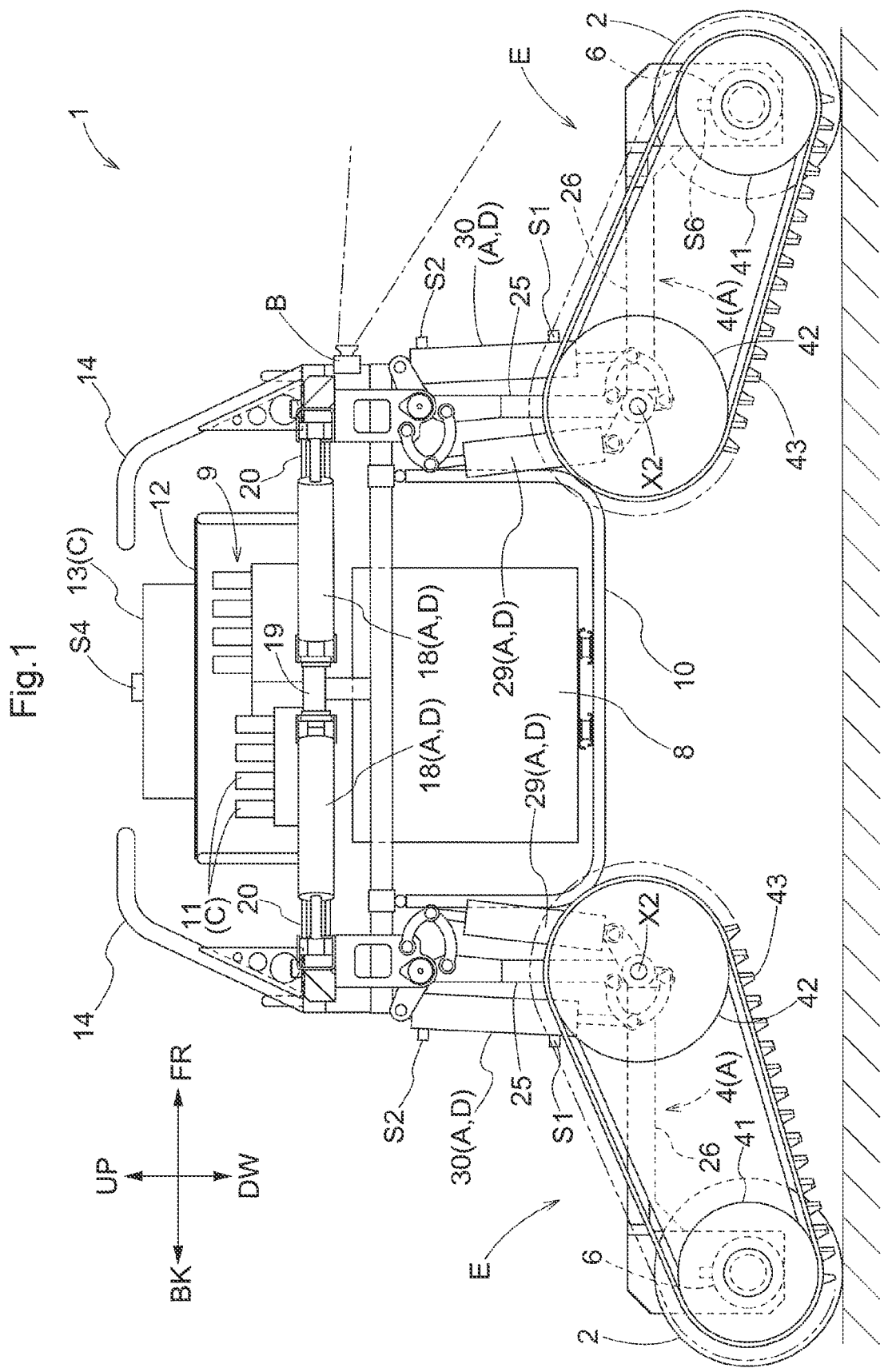
FIG. 1 is a side view of a work vehicle in its entirety.

The description below deals with a work vehicle as an embodiment of the present invention with reference to drawings. The present invention is, however, not limited to the embodiment below, and may be altered variously within its scope. The description below uses (i) terms such as "front" to refer to the side indicated by arrow FW in the drawings, (ii) terms such as "back" to refer to the side indicated by arrow BK, (iii) terms such as "right" to refer to the side indicated by arrow RH, (iv) terms such as "left" to refer to the side indicated by arrow LH, (v) terms such as "upward" to refer to the side indicated by arrow UP, and (vi) terms such as "downward" to refer to the side indicated by arrow DW. The description below also uses (i) expressions such as "front-back direction relative to the vehicle" to refer to the direction indicated by arrows FW and BK, (ii) expressions such as "left-right direction relative to the vehicle" to refer to the direction indicated by arrows RH and LH, and (iii) expressions such as "up-down direction" to refer to the direction indicated by arrows UP and DW.

Figure 2:
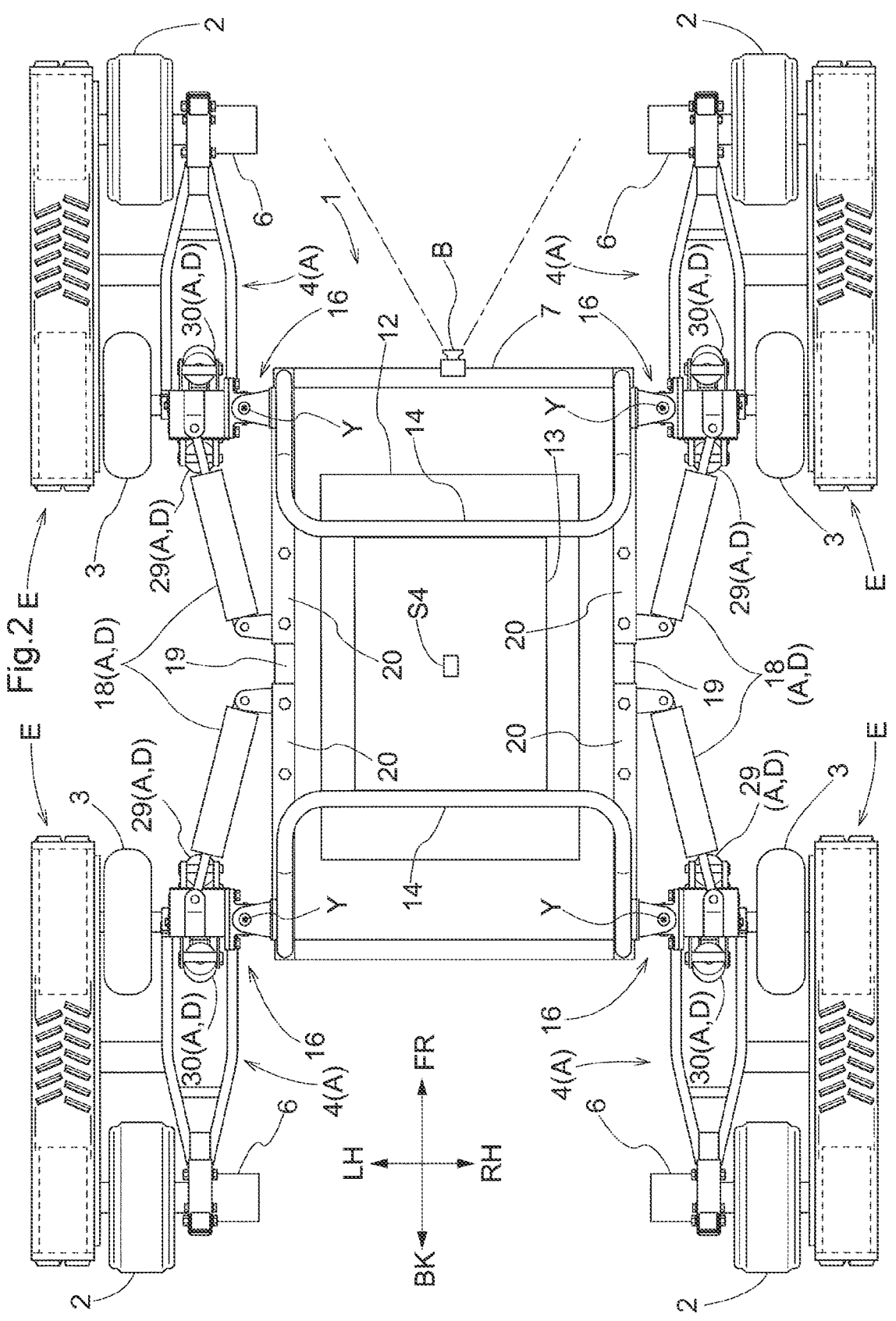
FIG. 2 is a plan view of a work vehicle in its entirety.

As illustrated in FIGS. 1 and 2, the work vehicle includes a body 1, a plurality of travel wheels 2, a plurality of holder mechanisms A, and a plurality of crawler travel devices E.

The travel wheels 2 are disposed at front and back portions of the body 1 on the left and right sides. The work vehicle as the present embodiment includes four travel wheels 2: one at a front portion on the left, one at a front portion on the right, one at a back portion on the left, and one at a back portion on the right.

The holder mechanisms A are held by the body 1 and hold the travel wheels 2 in such a manner as to be capable of independently moving the travel wheels 2 relative to the body 1. The work vehicle as the present embodiment includes four holder mechanisms A: one at a front portion on the left, one at a front portion on the right, one at a back portion on the left, and one at a back portion on the right.

Specifically, the holder mechanisms A each include a bendable link mechanism 4 and an orientation changer D. The orientation changer D is configured to change the orientation of its corresponding bendable link mechanism 4 independently. The orientation changer D for the present embodiment includes hydraulic cylinders (detailed later).

The bendable link mechanism 4 has a leading end provided with a travel wheel 2 and a hydraulic motor 6 configured to control the travel wheel 2 (detailed later).

Figure 3:
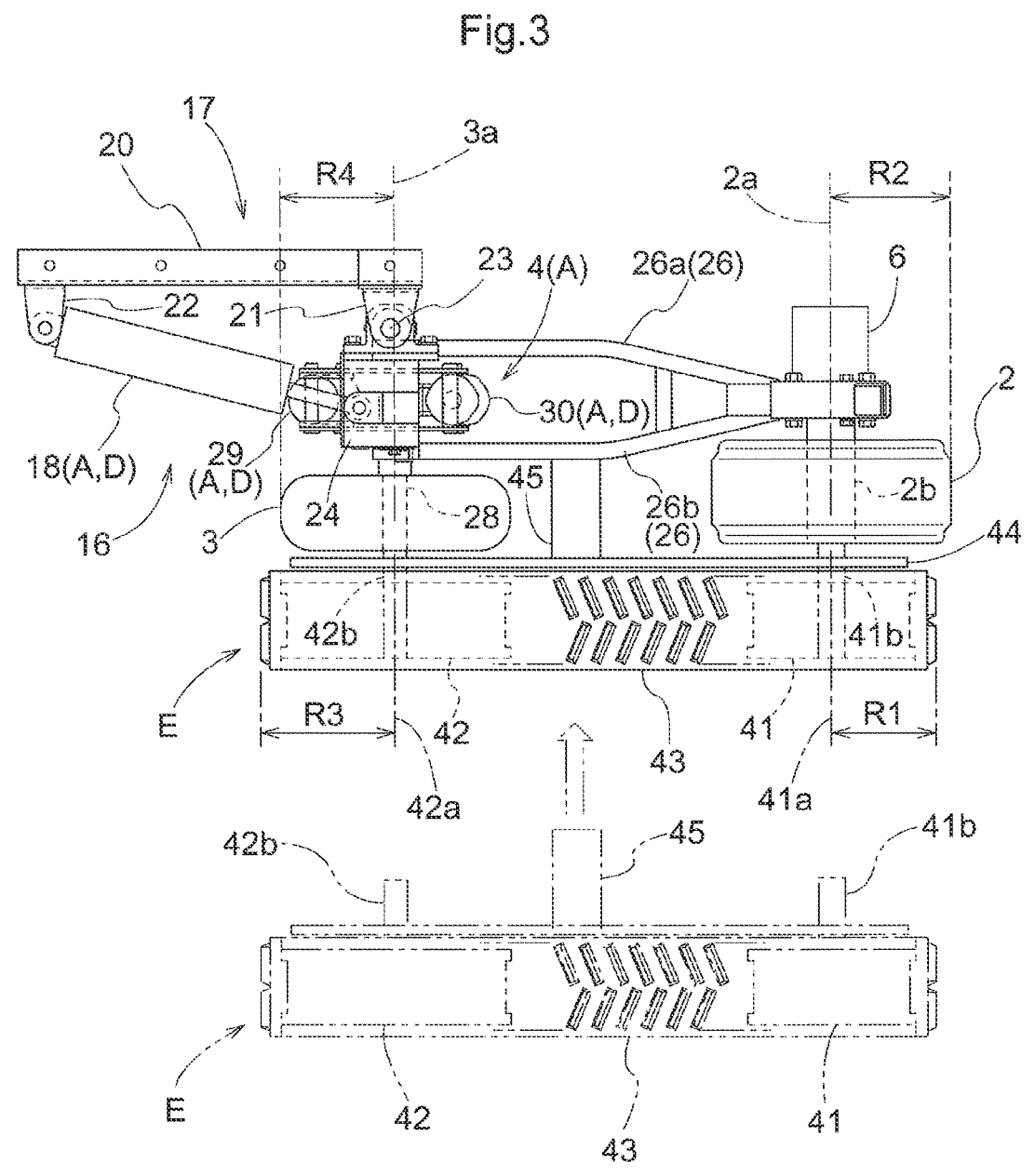

The present embodiment is configured such that as illustrated in FIG. 3, each crawler travel device E is attachable to and detachable from the corresponding holder mechanism A and is drivable by the corresponding hydraulic motor 6 as attached to the holder mechanism A.

[Body]

As illustrated in FIGS. 1 and 2, the body 1 includes a rectangular body frame 7, a hydraulic pressure source 8, a valve mechanism 9, a support mount 10, hydraulic pressure control valves 11, a casing 12, and an ECU 13, and is provided with the detector B.

The hydraulic pressure source 8 is, for example, a hydraulic pump drivable by driving means (not illustrated in the drawings) such as an engine or an electric motor. The hydraulic pressure source 8 is supported by the support mount 10, which is disposed under and coupled to the body frame 7. The hydraulic pressure source 8 is at a lower middle portion of the body 1. The hydraulic pressure source 8 is configured to supply operating oil to each orientation changer D through the valve mechanism 9. Although this is not illustrated in the drawings, detaching the support mount 10 from the body frame 7 allows the hydraulic pressure source 8 and the support mount 10 as integrally coupled to each other to be slid sideways out of the body 1 for removal. Subsequently sliding the hydraulic pressure source 8 and the support mount 10 sideways into the body 1 allows the support mount 10 to be attached to the body frame 7 again.

The valve mechanism 9 is supported by the body frame 7 and includes a plurality of hydraulic pressure control valves 11 configured to supply operating oil to and exhaust operating oil from each orientation changer D (which includes hydraulic cylinders) and the hydraulic motor 6 and to, for example, adjust the flow rate and pressure of the operating oil. The valve mechanism 9 is covered by the casing 12 from above, and operates under control of the electronic control unit (ECU) 13, which is disposed on and above the casing 12. The hydraulic pressure control valves 11 and the ECU 13 constitute the controller C.

The work vehicle includes two outer frames 14 disposed over the body frame 7 and configured to protect components such as the valve mechanism 9 in the casing 12 and the ECU 13 on the casing 12 in such events as a rollover of the body 1. The outer frames 14 are each in the form of a bar curved in a substantial U shape in a plan view and in a substantial L shape in a side view. One of the outer frames 14 has a left end and a right end both fixedly attached to a front end portion of the body frame 7, whereas the other outer frame 14 has a left end and a right end both fixedly attached to a back end portion of the body frame 7. The outer frames 14 are oriented in such a manner that their respective upper portions are close to each other to cover components such as the valve mechanism 9 and the ECU 13.

As mentioned above, the detector B is in the form of a camera configured to capture an image of the travel surface. The detector B is disposed at a front end portion of the body 1 and supported by the body frame 7. The detector B is configured to capture an image of the travel surface over time to generate image data and transmit the image data to the ECU 13.

[Holder Mechanisms]

As described above, the holder mechanisms A each include a bendable link mechanism 4 and an orientation changer D.

The bendable link mechanisms 4 each hold a corresponding one of the four travel wheels 2 in such a manner that the travel wheel 2 is capable of being lifted and lowered relative to the body 1 independently. The bendable link mechanisms 4 are each held by the body frame 7 with a turning mechanism 16 in-between in such a manner that the bendable link mechanism 4 is rotatable about a vertical axis Y.

The turning mechanisms 16 each include a body-side holder 17 and a turning hydraulic cylinder 18. The body-side holder 17 (see FIGS. 3 and 4) is coupled to the body frame 7 and holds the corresponding bendable link mechanism 4 in such a manner that the bendable link mechanism 4 is swingable. The turning hydraulic cylinder (hereinafter referred to as "turning cylinder") 18 is configured to turn the corresponding bendable link mechanism 4.

Figure 4:
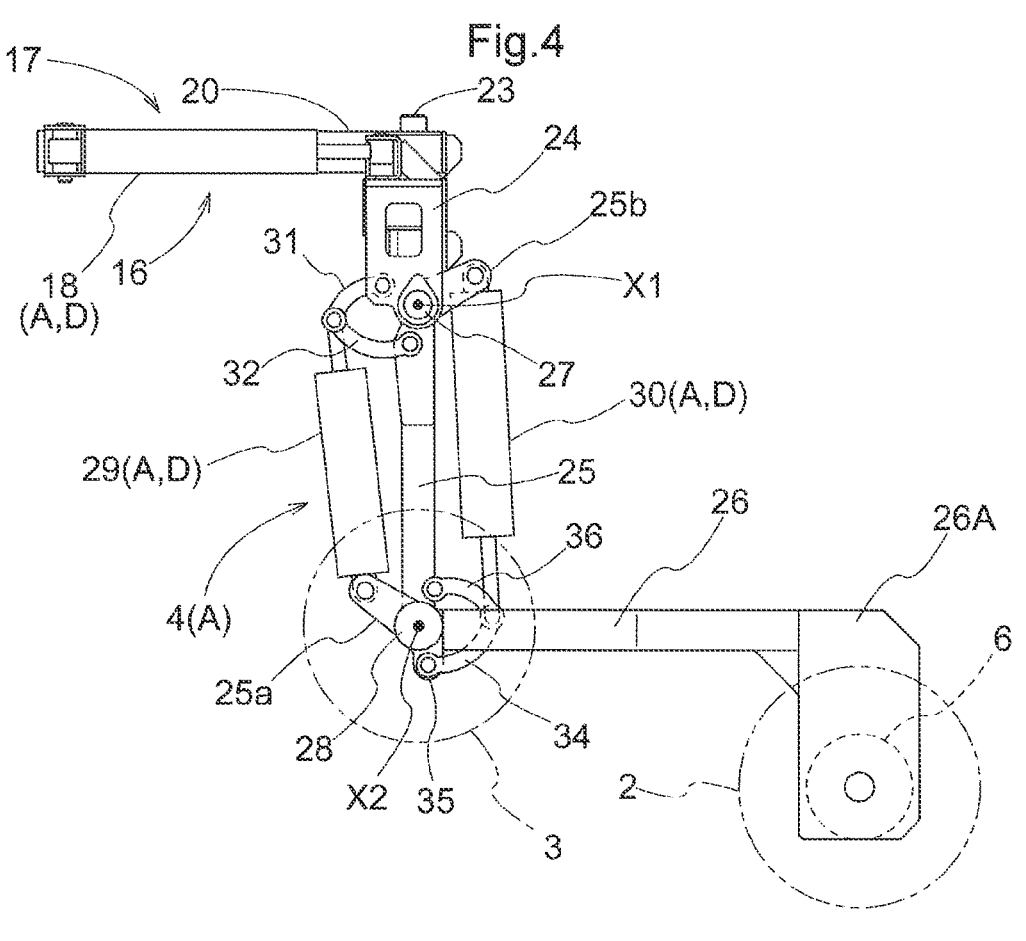
FIG. 4 is a side view of a bendable link mechanism.

As illustrated in FIGS. 3 and 4, each body-side holder 17 includes a coupler 20, an outer pivotally holding bracket 21, an inner pivotally holding bracket 22, and a vertical rotary shaft 23. The body-side holder 17 holds the corresponding bendable link mechanism 4 in such a manner that the bendable link mechanism 4 is rotatable about the vertical axis Y of the rotary shaft 23.

The coupler 20 holds a frame member 19 of the body frame 7 from laterally outward to be engaged with the frame member 19, and is detachably bolted to the frame member 19. The frame member 19 is an angular pipe extending in the front-back direction and disposed at a lateral portion of the body frame 7.

The outer pivotally holding bracket 21 is at an outer portion of the coupler 20 relative to the front-back direction of the body, whereas the inner pivotally holding bracket 22 is at an inner portion of the coupler 20 relative to the front-back direction of the body. The rotary shaft 23 is held by the outer pivotally holding bracket 21.

The bendable link mechanisms 4 each include a base end 24, a first link 25, and a second link 26. The base end 24 is held by the corresponding body-side holder 17 in such a manner as to be fixed in position in the up-down direction and rotatable about the vertical axis Y. The first link 25 has a first end and a second end, the first end being held by a lower portion of the base end 24 in such a manner that the first link 25 is rotatable about a lateral axis X1. The second link 26 has a first end and a second end, the first end being held by the second end of the first link 25 in such a manner that the second link 26 is rotatable about a lateral axis X2, the second end holding the corresponding travel wheel 2.

The base end 24 is in the form of a rectangular frame in a plan view. The base end 24 has an inner portion in the width direction relative to the body which inner portion is held by the outer pivotally holding bracket 21 of the corresponding body-side holder 17 with a rotary shaft 23 in-between in such a manner that the base end 24 is rotatable about the vertical axis Y. Each turning cylinder 18 has a first end and a second end, the first end being coupled to the corresponding inner pivotally holding bracket 22 in such a manner that the turning cylinder 18 is rotatable, the second end being coupled to a portion of the corresponding base end 24 which portion is lateral to the rotary shaft 23.

The first link 25 has a first end provided with a support shaft 27 held by the corresponding base end 24 in such a manner as to be rotatable relative to the base end 24. The first link 25 is, in other words, coupled to a lower portion of the corresponding base end 24 in such a manner as to be rotatable about the axis of the support shaft 27.

As illustrated in FIG. 4, the first link 25 includes a base-end-side arm 25b and an other-end-side arm 25a. The base-end-side arm 25b is integral with the first link 25, disposed at the first end of the first link 25, and extends obliquely in an upward and outward direction. The other-end-side arm 25a is integral with the first link 25, disposed at a second end of the first link 25, and extends obliquely in an upward and outward direction.

As illustrated in FIG. 3, the second link 26 includes a pair of left and right band plates 26a and 26b and has a substantial U shape in a plan view. The second link 26 is coupled at a portion to the first link 25 at which portion the plates 26a and 26b are apart from each other. The second link 26 is provided with a coupler shaft 28 disposed in an area between the plates 26a and 26b. The coupler shaft 28 is rotatably held by the second link 26 and couples the second link 26 to the corresponding first link 25. The second link 26 includes a swing-side end portion opposite to that portion at which the second link 26 is coupled to the first link 25, the swing-side end portion holding the corresponding travel wheel 2. As illustrated in FIG. 4, the swing-side end portion of the second link 26 includes an L-shaped extension 26A extending away from the body 1 in a substantial L shape. The L-shaped extension 26A has an extension-side end portion holding the corresponding travel wheel 2.

As illustrated in FIG. 2, the travel wheels 2 are held by the corresponding bendable link mechanisms 4 in such a manner as to be outward relative to the body in the left-right direction. Specifically, the travel wheels 2 are held by the respective swing-side end portions of the corresponding second links 26 in such a manner as to be outward relative to the body in the left-right direction. The hydraulic motors 6 are held by the respective swing-side end portions of the corresponding second links 26 in such a manner as to be inward relative to the body (that is, opposite to the corresponding travel wheels 2) in the left-right direction.

The orientation changers D correspond to the respective bendable link mechanisms 4, and are each configured to change the orientation of the corresponding bendable link mechanism 4 independently. The orientation changers D each include a turning cylinder 18 described above, a first hydraulic cylinder 29, and a second hydraulic cylinder 30. The first hydraulic cylinder 29 is configured to change the orientation of the corresponding first link 25 relative to the body 1. The second hydraulic cylinder 30 is configured to change the orientation of the corresponding second link 26 relative to the corresponding first link 25. The first and second hydraulic cylinders 29 and 30 are close to the corresponding first link 25 to form a group.

Each first link 25 and its corresponding first and second hydraulic cylinders 29 and 30 are between the plates 26a and 26b of the corresponding second link 26 in a plan view. The first hydraulic cylinder 29 is on the inner side of the corresponding first link 25 in the front-back direction of the body, and extends in the longitudinal direction of the first link 25. The first hydraulic cylinder 29 has a first end coupled in an interlocked manner to (i) a lower portion of the corresponding base end 24 with an arc-shaped first interlocking member 31 in-between and (ii) a base-end-side portion of the corresponding first link 25 with a second interlocking member 32 in-between. The first interlocking member 31 has an end portion pivotally coupled to an end portion of the corresponding second interlocking member 32 in such a manner that the first and second interlocking members 31 and 32 are rotatable relative to each other. The first hydraulic cylinder 29 has a second end coupled in an interlocked manner to the other-end-side arm 25a of the corresponding first link 25, which other-end-side arm 25a is integral with the first link 25.

The second hydraulic cylinder 30 is opposite to the first hydraulic cylinder 29, that is, on the outer side of the corresponding first link 25, in the front-back direction of the body, and extends substantially in the longitudinal direction of the first link 25. The second hydraulic cylinder 30 has a first end coupled in an interlocked manner to the base-end-side arm 25b of the corresponding first link 25, which base-end-side arm 25b is integral with the first link 25. The second hydraulic cylinder 30 has a second end coupled in an interlocked manner to an arm 35 of the corresponding second link 26 with a third interlocking member 34 in-between. The arm 35 is integral with the second link 26 at a base-end-side portion thereof. The second end of the second hydraulic cylinder 30 is also coupled in an inter-locked manner to a swing-end-side portion of the corresponding first link 25 with a fourth interlocking member 36 in-between. The third interlocking member 34 has an end portion pivotally coupled to an end portion of the corresponding fourth interlocking member 36 in such a manner that the third and fourth interlocking members 34 and 36 are rotatable relative to each other.

Extending and contracting each first hydraulic cylinder 29 while the corresponding second hydraulic cylinder 30 is off causes the corresponding first link 25, second link 26, and travel wheel 2 to swing about a lateral axis X1 as an integral combination while maintaining their respective orientations relative to one another, the lateral axis X1 being at a position at which the combination is pivotally coupled to the corresponding base end 24. Extending and contracting each second hydraulic cylinder 30 while the corresponding first hydraulic cylinder 29 is off causes the corresponding second link 26 and travel wheel 2 to swing about a lateral axis X2 as an integral combination while maintaining the orientation of the first link 25, the lateral axis X2 being at a position at which the corresponding first and second links 25 and 26 are coupled to each other.

The auxiliary wheels 3 are each rotatably held by the corresponding bendable link mechanism 4 at its intermediate bendable portion. The auxiliary wheels 3 are each in the form of a wheel with an outer diameter substantially equal to that of each travel wheel 2. Each first link 25 and its corresponding second link 26 are pivotally coupled to each other with a coupler shaft 28, which protrudes outward in the width direction of the body relative to the second link 26. The auxiliary wheels 3 are each rotatably held by the corresponding coupler shaft 28 at its protrusion. The auxiliary wheels 3 are disposed at front and back portions of the body 1 on the left and right sides, and are held by the respective holder mechanisms A.

Figure 5:
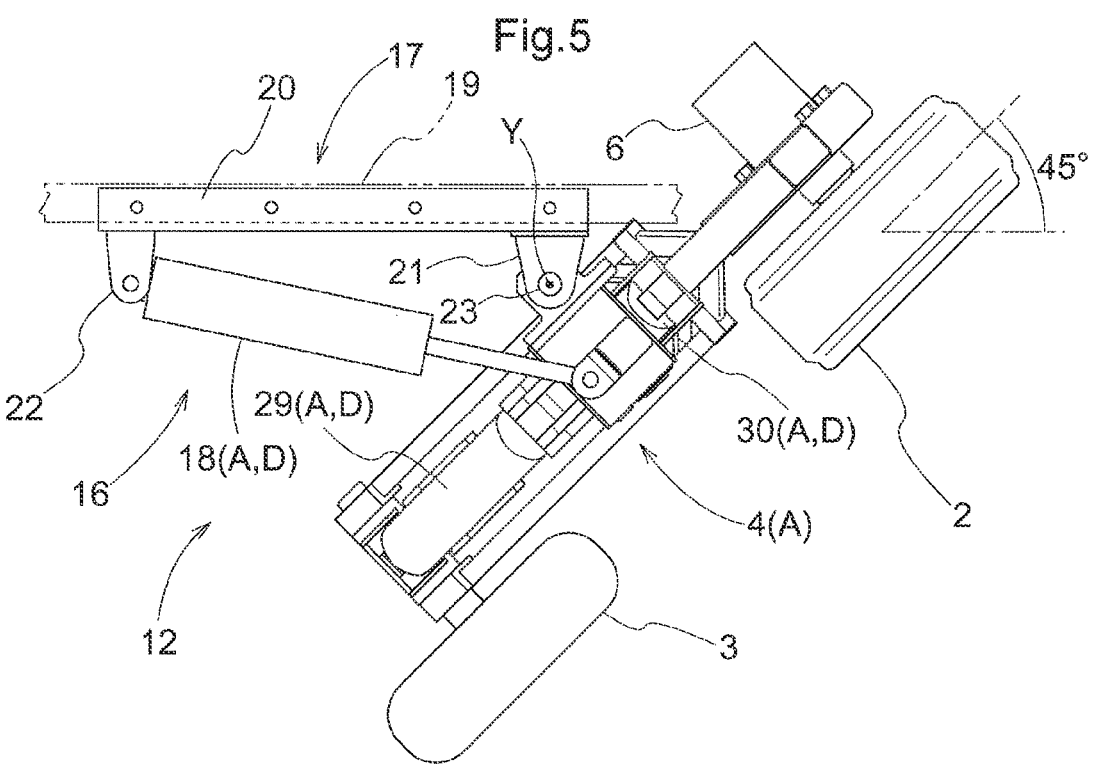
FIG. 5 is a plan view of a bendable link mechanism in a state for a left turn by means of a turning mechanism.
Figure 6:
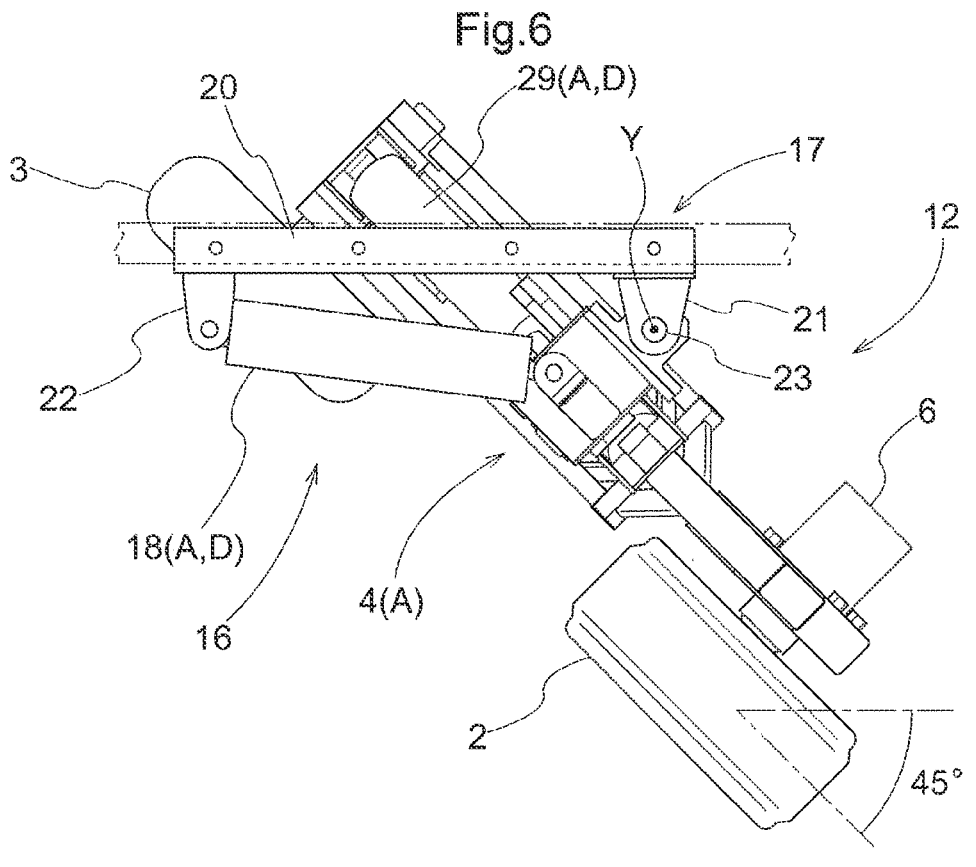
FIG. 6 is a plan view of a bendable link mechanism in a state for a right turn by means of a turning mechanism.

As illustrated in FIGS. 5 and 6, each outer pivotally holding bracket 21 holds an integral combination of the corresponding bendable link mechanism 4, travel wheel 2, auxiliary wheel 3, first hydraulic cylinder 29, and second hydraulic cylinder 30 in such a manner that the combination is rotatable about the vertical axis Y of the corresponding rotary shaft 23. Extending and contracting the corresponding turning cylinder 18 causes the combination to rotate in such a manner as to allow the travel wheel 2 to turn to the left and to the right each by approximately 45 degrees relative to the front-back direction for straight travel.

The hydraulic pressure source 8 is configured to supply operating oil through the valve mechanism 9 to the first and second hydraulic cylinders 29 and 30 of each bendable link mechanism 4. The valve mechanism 9 uses the hydraulic pressure control valves 11 to supply operating oil to and exhaust operating oil from the first and second hydraulic cylinders 29 and 30 for their extension and contraction. The hydraulic pressure control valves 11 are controlled by the ECU 13.

Those hydraulic pressure control valves 11 which correspond to the hydraulic motors 6 each adjust the flow rate of operating oil to change the rotation speed of the corresponding hydraulic motor 6, hence of the corresponding travel wheel 2. The hydraulic pressure control valves 11 are controlled by the ECU 13 on the basis of, for example, control information manually inputted or stored in advance.

[Crawler Travel Devices]

As illustrated in FIGS. 1, 2, and 3, the crawler travel devices E each include a driving sprocket 41 with a shaft 41b, a driven sprocket 42 with a shaft 42b, a belt 43 wound around the two sprockets, a frame 44 holding the shafts 41b and 42b, and a stay 45 having a first end attached to an intermediate portion of the frame 44 and a second end attached to an intermediate portion of a plate 26b of the second link 26 of the corresponding bendable link mechanism 4.

With a crawler travel device E attached to the corresponding holder mechanism A, the shaft 41b of the driving sprocket 41 is connected to the shaft 2b of the corresponding travel wheel 2 in such a manner as to have a central axis coincident with the central axis of the shaft 2b, whereas the shaft 42b of the driven sprocket 42 is connected to the shaft (that is, the coupler shaft 28) of the corresponding auxiliary wheel 3 in such a manner as to have a central axis coincident with the central axis of the shaft of the auxiliary wheel 3. With a crawler travel device E attached to the corresponding holder mechanism A, the driving sprocket 41 is coaxial with the corresponding travel wheel 2 and is drivable by the corresponding hydraulic motor 6, whereas the driven sprocket 42 is coaxial with the corresponding auxiliary wheel 3.

As illustrated in FIG. 3, the driving sprocket 41 has an axis 41a (that is, the central axis of the shaft 41b) apart from the outer surface of the belt 43 by a distance R1, whereas the travel wheel 2 has an axis 2a (that is, the central axis of the shaft 2b) apart from the outer surface of the travel wheel 2 by a distance R2, the distance R1 being equal to or slightly smaller than the distance R2. In other words, the crawler travel device E has, at a portion close to the driving sprocket 41, an outer diameter equal to or slightly smaller than the outer diameter of the travel wheel 2.

The driven sprocket 42 has an axis 42a (that is, the central axis of the shaft 42b) apart from the outer surface of the belt 43 by a distance R3, whereas the auxiliary wheel 3 has an axis 3a (that is, the central axis of the coupler shaft 28) apart from the outer surface of the auxiliary wheel 3 by a distance R4, the distance R3 being equal to or slight larger than the distance R4. In other words, the crawler travel device E has, at a portion close to the driven sprocket 42, an outer diameter equal to or slightly larger than the outer diameter of the auxiliary wheel 3.

[Sensors]

Figure 10:
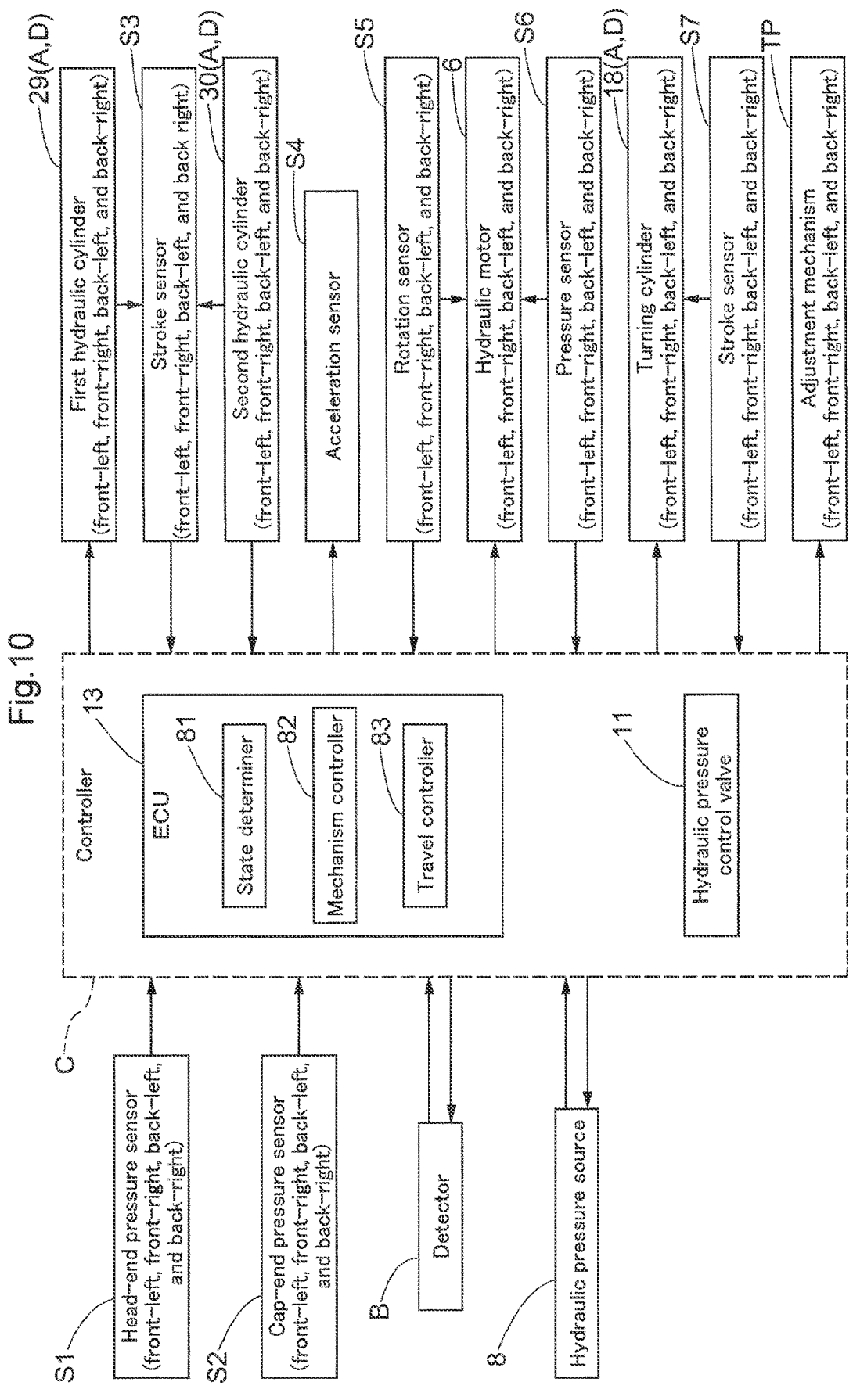
FIG. 10 is a control block diagram.

The work vehicle is provided with various sensors. Specifically, as illustrated in FIGS. 1 and 10, the work vehicle is provided with a head-end pressure sensor S1 and a cap-end pressure sensor S2 for each of the four second hydraulic cylinders 30. Each head-end pressure sensor S1 is configured to detect the hydraulic pressure in the head-end chamber of the corresponding second hydraulic cylinder 30. Each cap-end pressure sensor S2 is configured to detect the hydraulic pressure in the cap-end chamber of the corresponding second hydraulic cylinder 30. The pressure sensors S1 and S2 are each configured to transmit its detection result to the ECU 13.

As illustrated in FIG. 10, the work vehicle is provided with stroke sensors S3 configured to detect the respective amounts of extension and contraction of the four first hydraulic cylinders 29 and the four second hydraulic cylinders 30. The stroke sensors S3 are each configured to detect the amount of extension and contraction of its corresponding hydraulic cylinder 29, 30 as a value corresponding to the respective positions of the corresponding first and second links 25 and 26 as having been swung. The stroke sensors S3 are each configured to transmit its detection result to the ECU 13.

The pressure sensors S1 and S2 are not necessarily disposed at the positions mentioned above; the pressure sensors S1 and S2 each simply need be configured to detect (estimate) the hydraulic pressure in the corresponding one of the cap-end chamber and the head-end chamber. The pressure sensors S1 and S2 may each be disposed on a pipe between the valve mechanism 9 and the corresponding one of the cap-end chamber and the head-end chamber.

The controller C calculates from the detection results from the sensors S1 and S2 a thrust force necessity to support the body 1, and controls the supply of operating oil to the individual second hydraulic cylinders 30 on the basis of the result of the calculation.

As illustrated in FIGS. 1, 2 and 10, the body 1 is provided with an acceleration sensor S4 in the form of, for example, a triaxial acceleration sensor. The controller C determines the existence of a tilt in the front-back direction and the left-right direction on the basis of the result of detection by the acceleration sensor S4, and on the basis of the tilt, controls the orientation of the body 1, specifically, controls the supply of operating oil to the individual first and second hydraulic cylinders 29 and 30 so that the body 1 is oriented as intended.

As illustrated in FIGS. 1 and 10, the travel wheels 2 are each provided with a rotation sensor S5 configured to detect the speed at which the travel wheel 2 is rotating as driven by the corresponding hydraulic motor 6. The rotation sensors S5 are each configured to transmit its detection result to the ECU 13. The controller C, on the basis of the rotation speed of each travel wheel 2 detected by the corresponding rotation sensor S5, controls the supply (that is, the flow rate) of operating oil to the hydraulic motors 6 so that each travel wheel 2 rotates at an intended speed. The controller C controls the flow rate to control the rotation speed of each travel wheel 2.

As illustrated in FIG. 10, the work vehicle is provided with pressure sensors S6 each configured to detect the pressure of operating oil being supplied to the corresponding hydraulic motor 6. The pressure sensors S6 are each configured to transmit its detection result to the ECU 13. The controller C, on the basis of the pressure of operating oil detected by each pressure sensor S6, controls the supply (pressure) of operating oil to the hydraulic motors 6 so that each travel wheel 2 receives an intended drive torque. The controller C controls the pressure to control the drive torque for each travel wheel 2.

As illustrated in FIG. 10, the work vehicle is provided with stroke sensors S7 configured to detect the respective amounts of extension and contraction of the four turning cylinders 18. The stroke sensors S7 are each configured to detect the amount of extension and contraction of its corresponding turning cylinder 18 as a value corresponding to the position of the corresponding bendable link mechanism 4 as having been rotated. The stroke sensors S7 are each configured to transmit its detection result to the ECU 13.

As illustrated in FIG. 10, the work vehicle is provided with adjustment mechanisms TP each configured to adjust the respective air pressures of its corresponding travel wheel 2 and auxiliary wheel 3. The adjustment mechanisms TP are each in the form of, for example, a combination of an electrically operated air pump and air valve. The adjustment mechanisms TP are each configured to increase or decrease the respective air pressures of its corresponding travel wheel 2 and auxiliary wheel 3 under control of the controller C (specifically, the ECU 13).

As described above, the work vehicle as the present embodiment is configured to change the orientation of each bendable link mechanism 4 with use of the corresponding hydraulically drivable orientation changer D, which includes a turning cylinder 18 and hydraulic cylinders 29 and 30. Further, the work vehicle is configured to travel as driven with use of the hydraulic motors 6. The work vehicle is thus not susceptible to moisture, fine dust, or the like, and is suitable for agricultural work.

[ECU]

As illustrated in FIG. 10, the ECU 13 includes a state determiner 81, a mechanism controller 82, and a travel controller 83. The ECU 13 includes a memory and a CPU. The memory (not illustrated in the drawings) is, for example, a HDD or a nonvolatile RAM, and stores programs corresponding to the functional sections. The CPU (not illustrated in the drawings) is configured to execute the programs to cause the functional sections to each perform its function.

The state determiner 81 is configured to determine the state of the travel surface on the basis of an image from the detector B. Specifically, the state determiner 81 analyzes an image that the detector B has generated of the travel surface, and thereby determines the state of the travel surface (for example, the size of an unevenness on the travel surface and the steepness and direction of a slope). The state determiner 81 may include a neural network configured to receive an image that the detector B has generated of the travel surface and output information on the state of the travel surface. The neural network has been constructed through machine learning based on training data as a large number of images captured of travel surfaces and the state of the travel surface in each image.

The mechanism controller 82 is configured to, on the basis of the state of the travel surface that the state determiner 81 has determined, operate the hydraulic pressure control valves 11 to change the state of each holder mechanism A. The mechanism controller 82 for the present embodiment is configured to change the state of each holder mechanism A among three states: a first state, in which the travel wheels 2 are in contact with the travel surface; a second state, in which the crawler travel devices E each have a tread capable of coming into contact with a substantially horizontal travel surface (which may be, for example, a rough or damp ground); and a third state, in which the crawler travel devices E each have a tread along a sloped travel surface.

Figure 7:
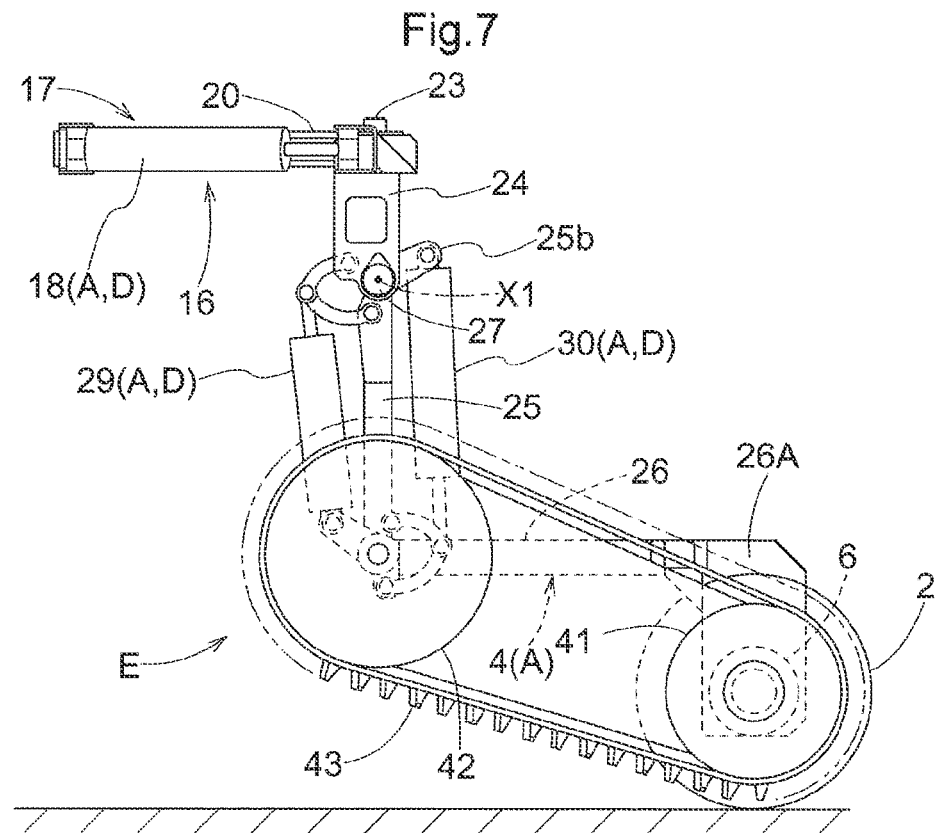
FIG. 7 is a side view of a holder mechanism in a first state.

FIG. 7 illustrates a holder mechanism A in the first state, in which the corresponding travel wheel 2 alone is in contact with the travel surface. In the example illustrated, the holder mechanism A is oriented such that the driving sprocket 41 of the corresponding crawler travel device E has a lower end above the lower end of the driven sprocket 42. The belt 43, in this state, has a lower portion inclined such that it is higher in position toward the inner side in the front-back direction of the body. The present embodiment is configured such that the crawler travel device E has, at a portion close to the driving sprocket 41, an outer diameter slightly smaller than the outer diameter of the travel wheel 2. This allows the travel wheel 2 alone to be in contact with a smooth travel surface such as that illustrated as an example, and keeps the crawler travel device E apart from the travel surface. The crawler travel device E may alternatively have, at a portion close to the driving sprocket 41, an outer diameter equal to the outer diameter of the travel wheel 2, in which case both the travel wheel 2 and the crawler travel device E are in contact with a smooth travel surface.

Figure 8:
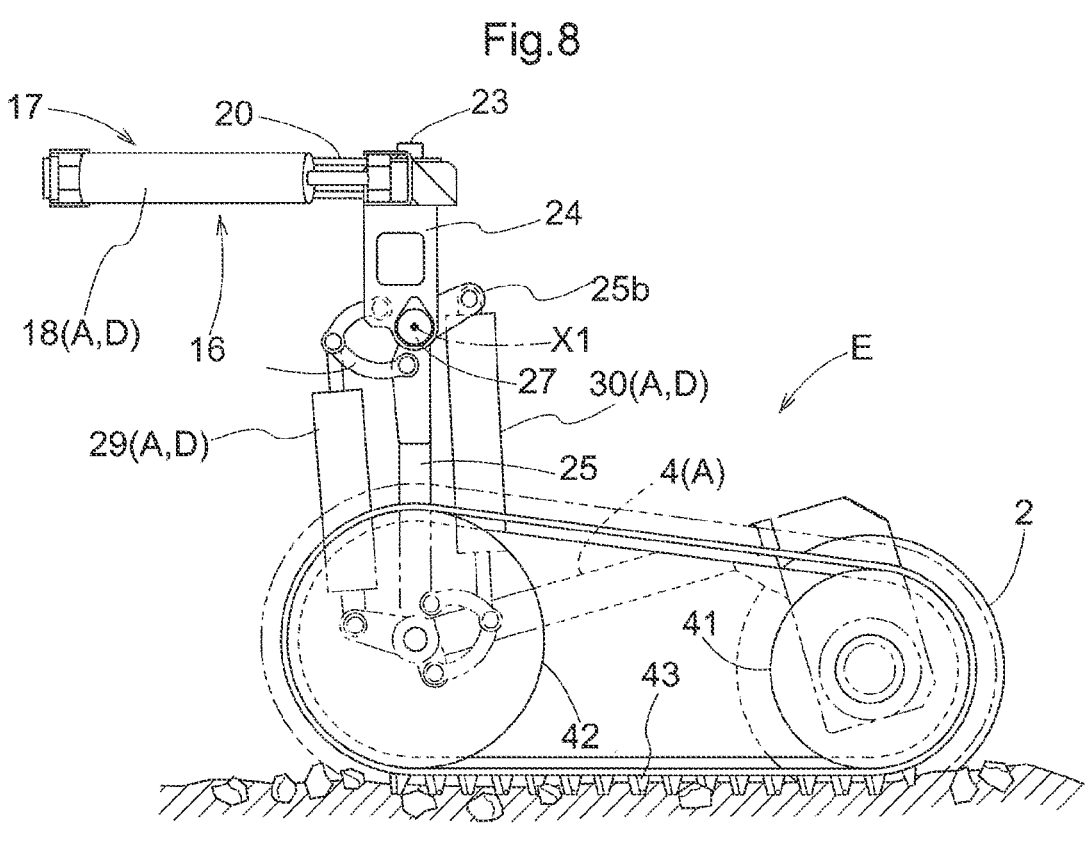
FIG. 8 is a side view of a holder mechanism in a second state.

FIG. 8 illustrates a holder mechanism A in the second state, in which the corresponding crawler travel device E is capable of coming into contact with the travel surface. Specifically, with a holder mechanism A in the second state, the corresponding crawler travel device E has a tread capable of coming into contact with a substantially horizontal travel surface, the tread being that portion of the belt 43 which extends from the driving sprocket 41 to the driven sprocket 42. In the example illustrated, the holder mechanism A is oriented such that the driving sprocket 41 of the crawler travel device E has a lower end at a height substantially equal to the height of the lower end of the driven sprocket 42. The belt 43, in this state, has a substantially horizontal lower portion. The crawler travel device E is in contact with a horizontal travel surface such as a rough or damp ground as illustrated as an example. The holder mechanism A may, in the second state, be oriented such that the driving sprocket 41 of the crawler travel device E has a lower end above the lower end of the driven sprocket 42.

Figure 9:
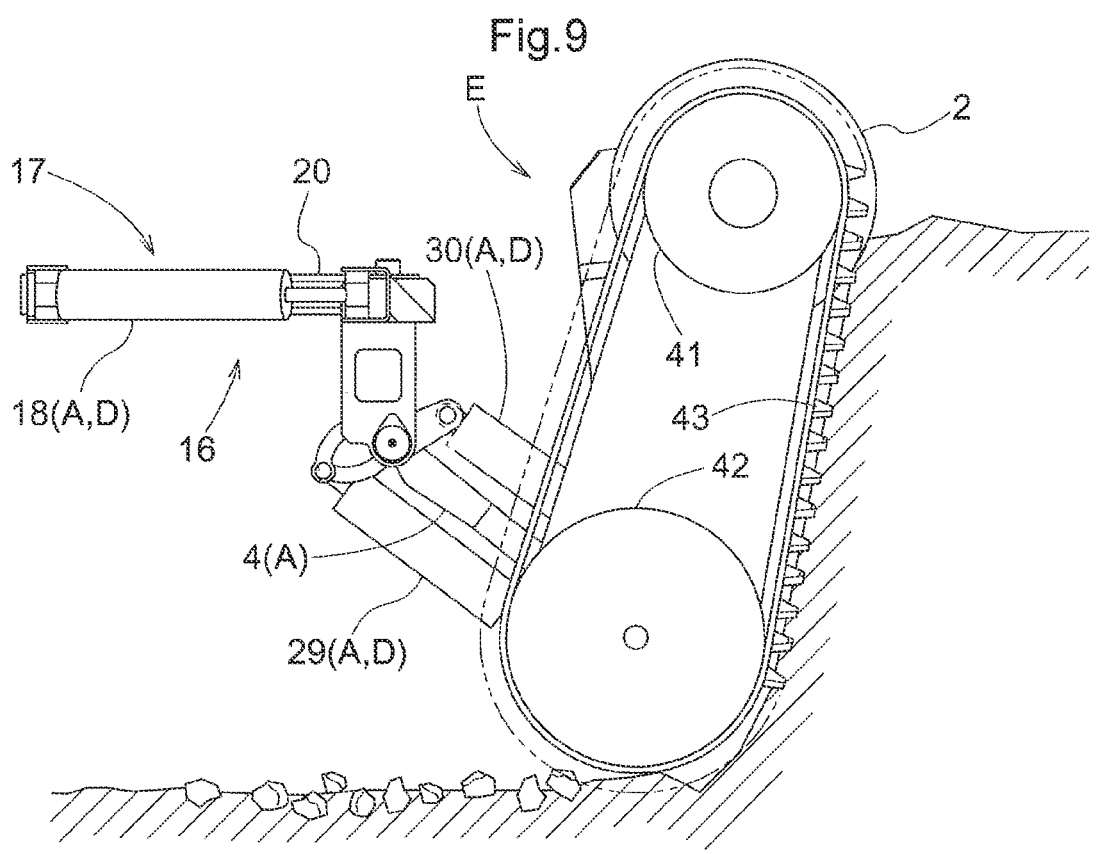
FIG. 9 is a side view of a holder mechanism in a third state.

FIG. 9 illustrates the third state, in which the crawler travel device E has a tread along a sloped travel surface. In the example illustrated, the holder mechanism A is oriented such that the driving sprocket 41 of the crawler travel device E is above the driven sprocket 42 and that the crawler travel device E has a tread (belt 43) along a surface of an elevation forward. The mechanism controller 82 is configured to, on the basis of the slope of the travel surface that the state determiner 81 has determined, control the orientation of each holder mechanism A such that the corresponding crawler travel device E has a tread along the slope of the travel surface.

The travel controller 83 is configured to control how the work vehicle travels (that is, travel forward or backward, stop, or turn). Specifically, the travel controller 83 operates the hydraulic pressure control valves 11 to control the supply of operating oil to the hydraulic motors 6 and the turning cylinders 18. The travel controller 83 controls how the work vehicle travels on the basis of, for example, a manually inputted travel instruction. The travel controller 83 may operate the hydraulic pressure control valves 11 to control how the work vehicle travels in such a manner that the work vehicle travels on a preset autonomous travel path.

[State Changing Process]

Figure 11:
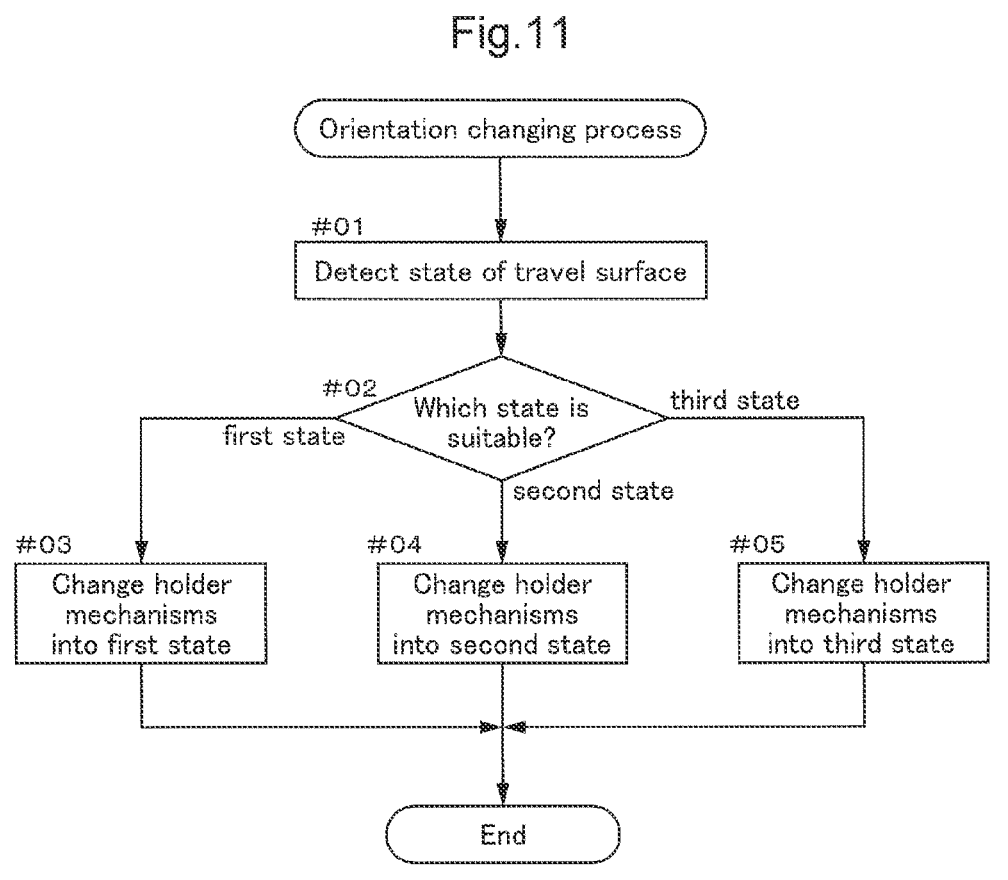

The description below deals with how the ECU 13 performs a state changing process with reference to the flowchart in FIG. 11. The ECU 13 repeats the state changing process while the work vehicle is traveling.

First, the detector B captures an image of the travel surface to generate image data, and transmits the image data to the ECU 13 (step #01).

The state determiner 81 receives the image data from the detector B, and analyzes the image to determine the state of the travel surface. The mechanism controller 82 then determines, on the basis of the state of the travel surface that the state determiner 81 has determined, which of the first to third states is suitable for the work vehicle to travel on the travel surface (step #02). The mechanism controller 82, for instance, determines that the first state is suitable if the travel surface is smooth, that the second state is suitable if the travel surface is a rough or damp ground, or that the third state is suitable if the travel surface is a steep slope, an elevation, a wall, or the like. If the mechanism controller 82 has determined that the first state is suitable ("First state" in step #02), the mechanism controller 82 operates each orientation changer D to change the corresponding holder mechanism A into the first state (step #03). The state changing process ends here.

If the mechanism controller 82 has determined that the second state is suitable ("Second state" in step #02), the mechanism controller 82 operates each orientation changer D to change the corresponding holder mechanism A into the second state (step #04). The state changing process ends here.

If the mechanism controller 82 has determined that the third state is suitable ("Third state" in step #02), the mechanism controller 82 operates each orientation changer D to change the corresponding holder mechanism A into the third state (step #05). The state changing process ends here.

VARIATIONS

The description below deals with a variation of the embodiment described above. Any member of the variation that is identical to a member of the above embodiment is assigned with the same reference sign, and is not described here.

Figure 12:
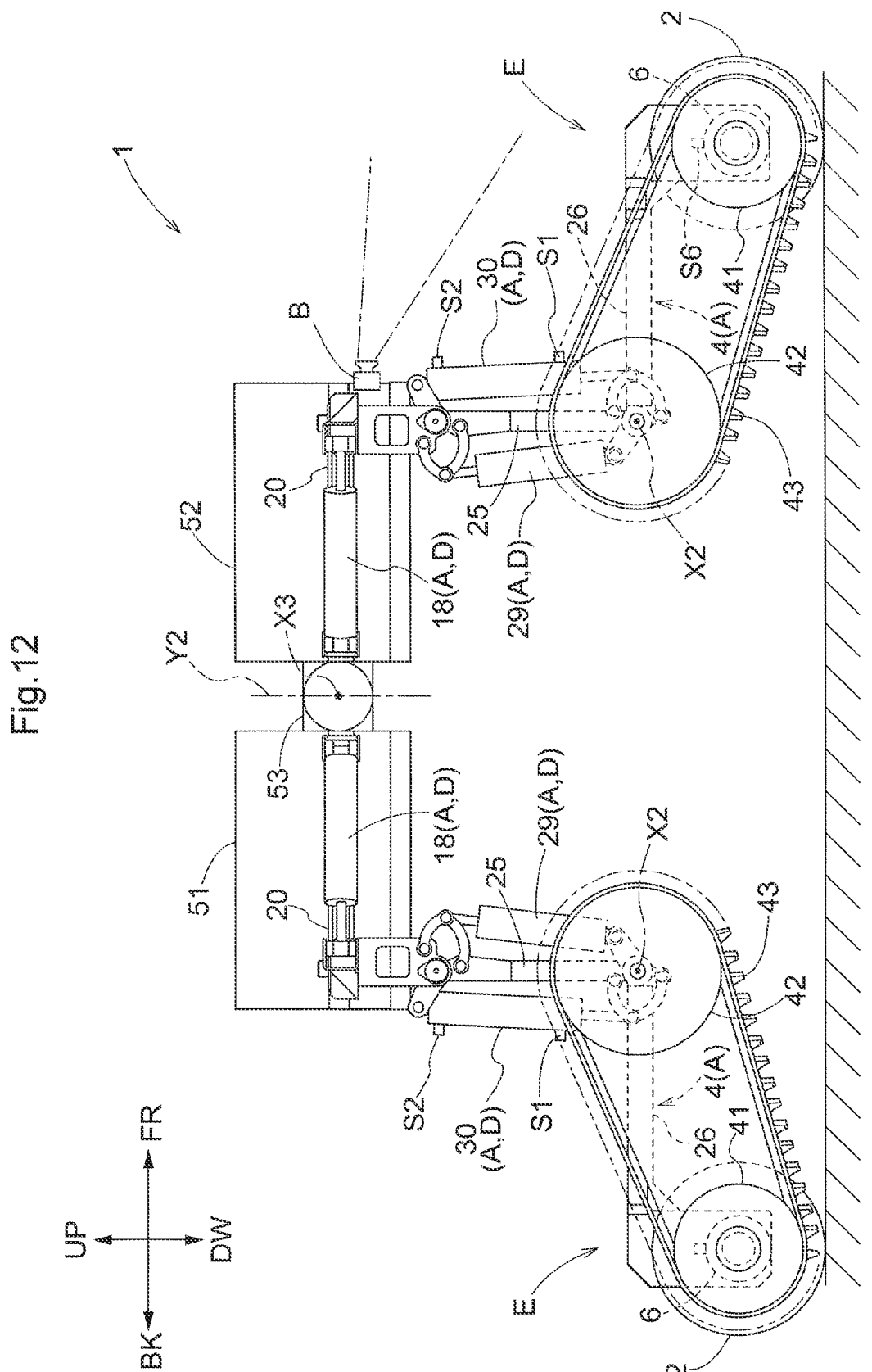
FIG. 12 is a side view of a work vehicle as a variation in its entirety.
Figure 13:
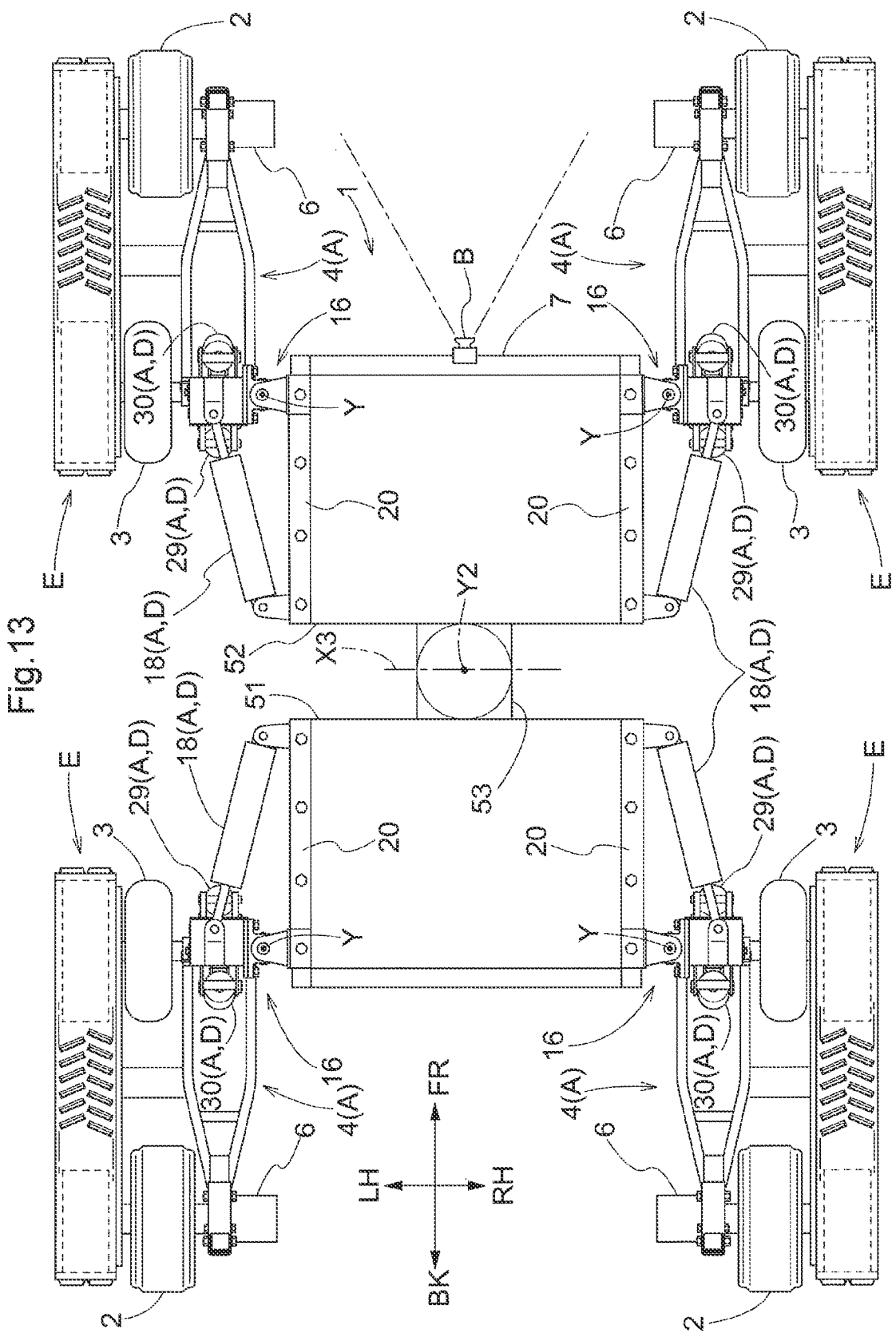
FIG. 13 is a plan view of a work vehicle as a variation in its entirety.

As illustrated in FIGS. 12 and 13, the body 1 includes a back body section 51, a front body section 52, and a coupler mechanism 53. The coupler mechanism 53 couples the front body section 52 to the back body section 51 in such a manner that the front body section 52 is swingable in the left-right and up-down directions of the body relative to the back body section 51. Specifically, the coupler mechanism 53 couples the front body section 52 to the back body section 51 in such a manner that the front body section 52 is swingable about a vertical axis Y2 and a horizontal axis X3 relative to the back body section 51.

The coupler mechanism 53 includes an actuator operable under control of the controller C. The actuator is, for example, a hydraulic cylinder. The coupler mechanism 53 is configured to receive operating oil from the controller C and cause the front body section 52 to swing about the vertical axis Y2 and the horizontal axis X3 relative to the back body section 51.

The front body section 52 holds each holder mechanism A holding a front travel wheel 2, whereas the back body section 51 holds each holder mechanism A holding a rear travel wheel 2. The coupler mechanism 53 causes the front body section 52 to swing about the vertical axis Y2 relative to the back body section 51. This allows the work vehicle to turn without the operation of the turning cylinders 18. The present variation thus eliminates the need to include the turning cylinders 18 and the mechanism of the holder mechanisms A for rotation about the vertical axis Y2, with the result of a simple structure.

The coupler mechanism 53 causes the front body section 52 to swing about the horizontal axis X3 relative to the back body section 51. This makes it possible to change (i) the distance between the front travel wheels 2 (front crawler travel devices E) and the rear travel wheels 2 (rear crawler travel devices E), (ii) the vehicle height, and (iii) the pressure at which the front travel wheels 2 (front crawler travel devices E) is in contact with the ground, without the operation of the first and second hydraulic cylinders 29 and 30.

The coupler mechanism 53 may alternatively couple the front body section 52 to the back body section 51 in such a manner that the front body section 52 is swingable only in the left-right of the body or only in the up-down direction of the body.

The coupler mechanism 53 may alternatively not include an actuator.

ALTERNATIVE EMBODIMENTS (1) The crawler travel devices E are not necessarily attached to and detached from the respective holder mechanisms A in the manner described above as an example. The driving sprocket 41 may be positioned differently and not coaxial with the corresponding travel wheel 2. The driven sprocket 42 may be positioned differently and not coaxial with the corresponding auxiliary wheel 3. The belt 43 may be wound around the corresponding travel wheel 2 and auxiliary wheel 3, in which case the travel wheel 2 doubles as a driving wheel for the crawler travel device E, and the auxiliary wheel 3 doubles as a driven wheel for the crawler travel device E.

(2) The work vehicle may include at least one crawler travel device E attachable to and detachable from respective holder mechanisms A, for example, two front holder mechanisms A or two rear holder mechanisms A.

(3) The controller C may alternatively be configured to change each holder mechanism A only between the first and second states or among four or more states including the first to third states.

(4) The holder mechanisms A are not necessarily configured as described above; for instance, the holder mechanisms A may each include a single link or three or more links. The work vehicle may include holder mechanisms A for only two travel wheels 2 (for example, the front ones or the rear ones).

(5) The orientation changers D are not necessarily configured as described above; for instance, the orientation changers D may each include an electrically operated actuator.

(6) The travel wheels 2 may be drivable by an electric motor, an engine, or the like.

(7) The detector B may be in the form of, for example, an ultrasonic sensor or a millimeter-wave radar.

INDUSTRIAL APPLICABILITY

The present invention is applicable to a work vehicle designed to travel on a highly uneven travel surface.

REFERENCE SIGNS LIST

1 Body
2 Travel wheel
2*a* Axis
3 Auxiliary wheel
3*a* Axis
4 Bendable link mechanism
6 Hydraulic motor
29 First hydraulic cylinder
30 Second hydraulic cylinder
41 Driving sprocket
41*a* Axis

14

42 Driven sprocket
42*a* Axis
43 Belt
51 Back body section
52 Front body section
A Holder mechanism
D Orientation changer
E Crawler travel device
The invention claimed is:

1. A work vehicle, comprising:
a body;
a plurality of travel wheels at front and back portions of the body on each of left and right sides;
a plurality of holder mechanisms held by the body and holding the respective travel wheels in such a manner as to be capable of moving the travel wheels independently of one another relative to the body;
a plurality of auxiliary wheels disposed at front and back portions of the body on each of the left and right sides and held by the respective holder mechanisms; and
a plurality of crawler travel devices attachable to and detachable from the respective holder mechanisms, each of the crawler travel devices comprising a driving sprocket, a driven sprocket, and a belt wound around the driving sprocket and the driven sprocket,
wherein with each crawler travel device attached to a corresponding one of the holder mechanisms, the driven sprocket is coaxial with a corresponding one of the auxiliary wheels.

2. The work vehicle according to claim 1, wherein:
the holder mechanisms each comprise a hydraulic motor configured to drive a corresponding one of the travel wheels, and
the crawler travel devices are each drivable by a corresponding one of the hydraulic motors while the crawler travel device is attached to a corresponding one of the holder mechanisms.

3. The work vehicle according to claim 2, wherein:
with each crawler travel device attached to a corresponding one of the holder mechanisms, the driving sprocket is coaxial with a corresponding one of the travel wheels and drivable by a corresponding one of the hydraulic motors.

4. The work vehicle according to claim 1, wherein:
the driving sprocket has an axis apart from an outer surface of the belt by a first distance, whereas a corresponding one of the travel wheels has an axis apart from an outer surface of the corresponding travel wheel by a second distance, the first distance is equal to or smaller than the second distance.

5. The work vehicle according to claim 1, wherein:
the holder mechanisms each comprise:
a bendable link mechanism; and
an orientation changer configured to change an orientation of the bendable link mechanism independently, and
the bendable link mechanism has a leading end provided with a corresponding one of the travel wheels.

6. The work vehicle according to claim 5, wherein:
the orientation changer is a hydraulic cylinder.

7. The work vehicle according to claim 1, wherein:
the body comprises:
a back body section; and
a front body section swingable in a left-right direction of the body relative to the back body section,
the front body section holds each holder mechanism holding a front one of the travel wheels, and the back body section holds each holder mechanism holding a rear one of the travel wheels.

* * * * *